April 17, 1934.   C. V. CARLSON ET AL   1,954,986
CRANK CASE DRAIN PLUG
Filed May 12, 1932
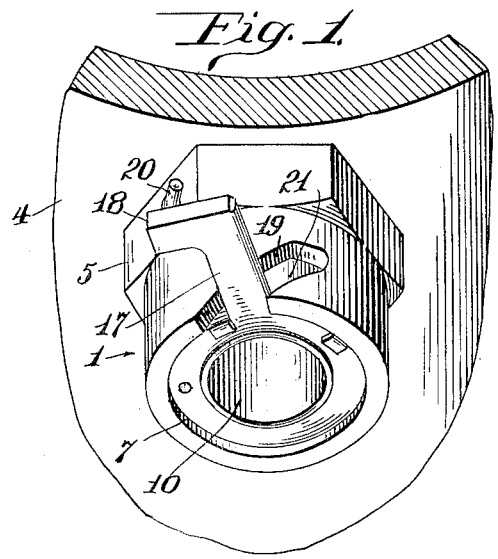
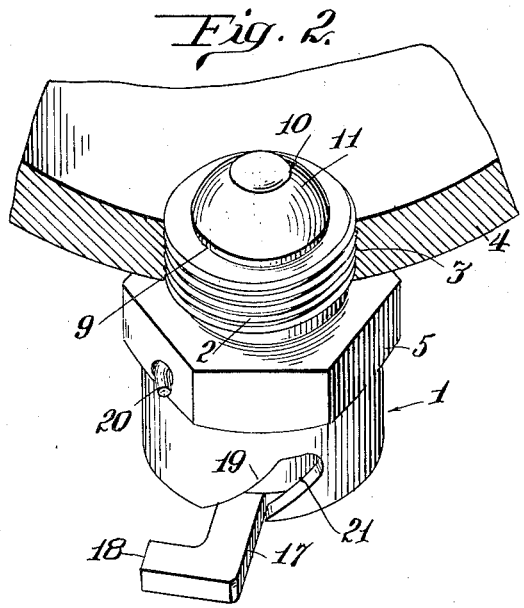
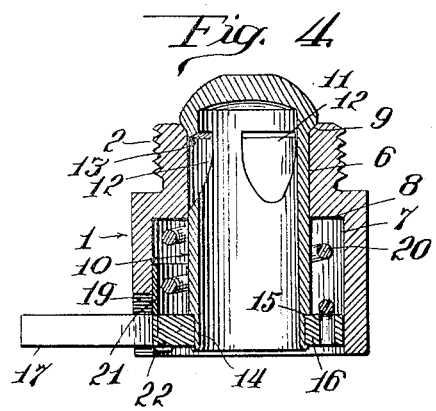
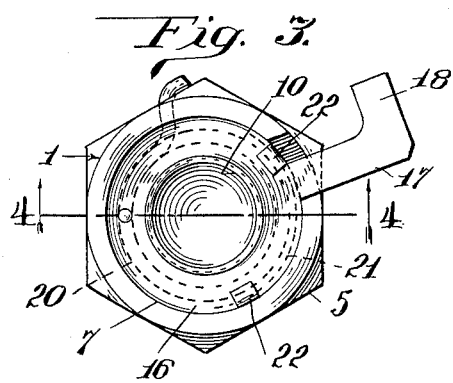
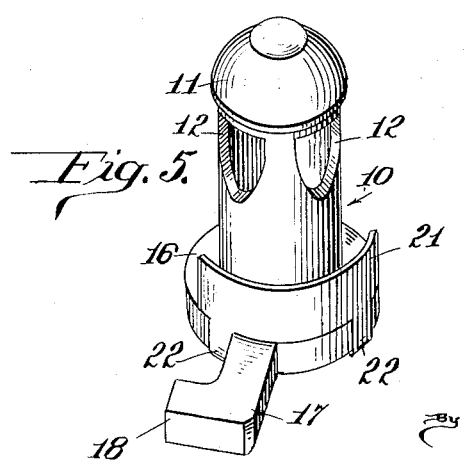
Inventors
Carl V. Carlson
and Otto Pedersen Patented Apr. 17, 1934

1,954,986

UNITED STATES PATENT OFFICE 1,954,986

CRANK CASE DRAIN PLUG

Carl V. Carlson, Chicago, and Otto Pedersen, Berkley, Ill.

Application May 12, 1932, Serial No. 610,824

2 Claims. (Cl. 137—34)

This invention relates to improvements in crank case drain plugs, and it consists of the matters hereinafter described and more particularly pointed out in the appended claims.

The primary object of the invention is to provide a drain plug for the crank case of automobile and like engines which does not require the complete removal of the plug when it is desired to drain the crank case in which it is used.

Another object of the invention is to provide a self-closing drain plug which positively remains tight against leakage and which may be opened for draining purposes without the use of a wrench and without the necessity of crawling under the automobile when it is desired to carry out a draining operation.

A further object of the invention is to provide a plug for this purpose which is simple in construction and consists of but a few parts that may be made and assembled at a low cost and which cooperate to insure an efficient and convenient plug for this purpose.

The above mentioned objects of the invention, as well as others, together with the many advantages thereof, will more fully appear as we proceed with our specification.

In the drawing:

Fig. 1 is a perspective view of our improved drain plug when in place in a crank case and when viewed from the outside thereof.

Fig. 2 is another perspective view of our improved plug when in place in a crank case when viewed from inside the crank case.

Fig. 3 is a bottom plan view of the plug.

Fig. 4 is a transverse vertical sectional view through the same as taken on the line 4—4 of Fig. 3.

Fig. 5 is a perspective view of a valve assembly embodied in our improved drain plug.

In general our improved plug includes a tubular plug body having a threaded extension of reduced diameter at one end adapted for a screw threaded engagement in the drain plug opening of the crank case of an automobile or like engine. The body has a hexagonal external cross-section at a point between its ends to receive a wrench in the initial application of the plug in said drain plug opening.

The top end of the plug within the crank case is made to provide a valve seat upon which engages the closed head of a tubular valve stem or member. Said member, which has drain openings beneath the head, is mounted in the plug body for a turning as well as a longitudinal movement. Secured to the open bottom end of said valve member is a plate that includes a laterally extending hook arm and this arm is adapted to ride in a helically inclined slot formed in the bottom end of the plug body. This plate also carries a closure member for the slot and between said plate and a shoulder in the plug body is a spring. Said spring acts as a tensional and a torsional one and thus normally functions to hold the valve closed. In draining a crank case to which the plug is applied, it is only necessary to reach under the crank case with a hooked rod and engage the hooked end of the plate arm and thereafter exert a pull on said rod. In this pull on the rod, the tubular valve member turns with the plate as its arm rides up the inclined slot and this will impart both a longitudinal as well as a rotative movement to the valve plug so that its head leaves its seat and brings the opening in said valve member above the top of the plug body so that the oil may drain down through and out said tubular valve member. As soon as the holding pressure is released on the plate arm, the spring before mentioned acts to close the valve plug.

Referring now in detail to that embodiment of the invention illustrated in the drawing, 1 indicates the tubular body of the plug which is provided at its top end with a threaded extension 2. This extension is adapted for a screw threaded engagement in the drain opening 3 in the bottom 4 of the crank case of an automobile or like engine. Said body is made with an external hexagonal portion 5 at a point below the extension 2 to receive a wrench for the initial application of the plug as a whole to a crank case. In the top end of the plug body is an axial bore 6 of one diameter that opens through the top end of said body, and in the bottom end of said body is a second bore 7 of a larger diameter that opens through said bottom end of the body, said two bores defining at their junction a downwardly facing, annular shoulder 8. At the top end of the bore 6 the extension 2 is formed to provide a valve seat 9.

Snugly fitting in the bore 6 for a rotative as well as a longitudinal movement and extending into the bore 7 is a tubular valve member 10. Said member is closed at its top end by a head 11 formed at its periphery to engage upon the seat 9. Just below said head, a plurality of openings 12 is formed in the valve member 10 and the top ends of said openings are made to provide sharp edges 13.

The bottom end of said valve member is reduced in external diameter to form a neck 14 terminating at its top end in a shoulder 15. Engaged on said neck up against the shoulder 15 is a plate 16 of a diameter having a substantially snug fit in the bore 7. When said plate has been thus positioned on said neck, the bottom end of said neck is upset or flanged outwardly, as best shown in Fig. 4, to rigidly secure said plate to said valve member.

The plate 16 is provided at one side with a radially extending arm 17 that terminates in a hook or finger 18 and said arm engages in a helically inclined slot 19 in the bottom end of the plug body 1, said slot providing a cam.

In the bore 7 and surrounding that part of the valve member therein, is a spring 20, one end of which is anchored in the plug body and the other end of which is anchored in the plate 16. The said spring functions as a tension as well as a torsion spring for a purpose soon to appear. On the top side of the plate 16 and extending arcuately beyond each side of the arm 17 is a slot guard plate 21 which normally acts to keep the slot 19 closed against the entrance of dust and dirt.

While such a slot guard plate may be formed integrally with the plate 16, we prefer to form it as a separate part and then later attach the same because, in this manner, the plate with its arm can be produced as a stamping. When said slot guard plate is made as a separate part, we provide thereon two depending fingers 22 of a length greater than the thickness of the plate 16 and in the edge of said plate on each side of the arm 17, we provide a recess to receive the respective fingers which engage therein and thereafter we turn over the bottom ends of said fingers to secure the parts together in operative relation.

In the operation of the device, assume that the plug as a whole is in place in the bottom of a crank case of an engine. As the spring 20 functions as a tension as well as a torsion spring, it is apparent that it not only holds the head of the valve member down upon the seat but normally acts to hold the arm 17 at the bottom end of the slot 19.

To drain the crank case, any hooked element may be engaged with the hook 18 of the arm 17 and a pull on said element will cause said arm to travel up the slot 19. This will impart an upward longitudinal as well as a turning movement to said valve member and will lift the head off the seat 9 to expose the openings 12 above the top of the plug body in communication with the interior of the crank case so that oil will drain out through said openings into the tubular valve member and then down and out the bottom end of the same.

Thus, as long as the arm 17 is held by said element, it is apparent that the valve is open and that the spring is under a greater than normal tension and torsion. As soon as the arm 17 is released, the spring causes the arm to travel toward the outer and bottom end of the slot 19 and this causes the valve member to close with a downward turning action. In this downward movement of the valve member, should any sediment or solids lodge upon the seat 9, the sharp edges 13 at the top end of the openings 12 will act to cut through them and the turning action of said member will dislodge said sediment so that it cannot adhere to the seat and thus hold the head slightly off the seat which is supposed to be closed tightly thereon.

With a structure made as described, it is not necessary to use a wrench in opening the plug for draining purposes. All that is necessary is to engage the arm 17 and impart a short pull thereto and as soon as the pull is released, the valve closes automatically and indeed tightly, and in this closing movement it is self cleaning.

While in describing the invention, we have referred in detail to the form, arrangement, and construction of the parts embodied in the plug, the same is to be considered merely as illustrative only, as we do not wish to be limited thereto except as may be specifically set forth in the appended claims.

We claim as our invention:

1. A valve of the kind described embodying therein a tubular plug body having a valve seat at one end and a tubular valve member arranged in said body and having a head at one end for normal engagement upon said seat and having openings therein below said head, a plate member fixed to the other end of said tubular valve member, said plate including an arm disposed in an inclined slot in the plug body and operable to impart a turning movement in one direction to said tubular valve member and which arm operates in conjunction with said slot to impart an endwise opening movement to said valve member when said plate member is turned in said one direction, and a torsional as well as a tensional spring arranged in the plug body about a part of the tubular valve member and anchored at its ends to said plug body and plate member respectively, and normally acting to turn said plate member in the other direction and to hold said head in engagement upon said seat.

2. A crank case drain valve embodying therein a tubular valve plug body member having a seat at one end, a valve member having a head on one end thereof to engage upon said seat, a spring in said body member and surrounding the valve member and normally acting to hold the same with its head in engagement on said seat, means providing a cam, and means associated with the cam for imparting a turning movement to the valve member and for imparting an endwise movement thereto to move the valve head away from the seat, the valve member having an opening adjacent its head to permit a flow of oil therethrough.

CARL V. CARLSON.
OTTO PEDERSEN.